US012547835B2

(12) United States Patent
Šuppa et al.

(10) Patent No.: US 12,547,835 B2
(45) Date of Patent: Feb. 10, 2026

(54) AUTOMATIC EXTRACTION OF SEMANTICALLY SIMILAR QUESTION TOPICS

(71) Applicant: Cisco Technology, Inc., San Jose, CA (US)

(72) Inventors: Marek Šuppa, Bratislava (SK); Daniela Jašš, Bratislava (SK); Katarína Kozáková, Bratislava (SK); Daniel Skala, Groningen (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 493 days.

(21) Appl. No.: 18/065,758

(22) Filed: Dec. 14, 2022

(65) Prior Publication Data
US 2024/0202448 A1 Jun. 20, 2024

(51) Int. Cl.
*G06F 40/30* (2020.01)
*G06F 16/35* (2025.01)
*G06F 40/284* (2020.01)

(52) U.S. Cl.
CPC .............. *G06F 40/30* (2020.01); *G06F 16/35* (2019.01); *G06F 40/284* (2020.01)

(58) Field of Classification Search
CPC ........ G06F 40/30; G06F 16/35; G06F 40/284; G06F 40/295; G06F 40/35; G06F 16/3329; G06F 16/3344; G06F 16/353; G06F 16/355; G06F 16/358; G10L 15/22; G10L 15/26; G06N 3/045; G06N 3/08; G06N 5/022; G06N 20/00
See application file for complete search history.

(56) References Cited

U.S. PATENT DOCUMENTS

| 8,713,021 B2* | 4/2014 | Bellegarda | G06F 18/2413 |
| | | | 707/739 |
| 2013/0085745 A1 | 4/2013 | Koister et al. | |
| 2016/0232221 A1* | 8/2016 | McCloskey | G06F 16/285 |
| 2016/0314200 A1 | 10/2016 | Markman et al. | |
| 2016/0371277 A1 | 12/2016 | Allen et al. | |
| 2018/0329882 A1* | 11/2018 | Bennett | G06N 20/00 |
| 2019/0005127 A1 | 1/2019 | Alkov et al. | |
| 2019/0079938 A1* | 3/2019 | Agrawal | G06F 16/358 |

(Continued)

OTHER PUBLICATIONS

"Semantic based Document Clustering: A Detailed Review"; International Journal of Computer Applications (0975-8887) vol. 52—No. 5, Aug. 2012, (Shah et al.) (Year: 2012).*

(Continued)

*Primary Examiner* — Andrew C Flanders
(74) *Attorney, Agent, or Firm* — Edell, Shapiro & Finnan, LLC

(57) ABSTRACT

A method, computer system, and computer program product are provided for automatically extracting semantically-similar question topics. A set of documents, wherein each document includes a plurality of words. One or more clusters of documents are identified in the set of documents based on a presence of common words in the documents of the one or more clusters. The one or more clusters are adjusted based on semantic similarity by adding or removing one or more documents from the one or more clusters. A topic is extracted from each adjusted cluster of documents.

20 Claims, 6 Drawing Sheets

(56) References Cited

U.S. PATENT DOCUMENTS

2021/0365524 A9* 11/2021 Anderson ........... G06F 16/9038
2022/0004715 A1* 1/2022 Patel ...................... G06N 5/022

OTHER PUBLICATIONS

"Efficient Phrase-Based Document Similarity for Clustering"; IEEE Transactions on Knowledge and Data Engineering, vol. 20, No. 9, Sep. 2008, (Chim et al.) (Year: 2008).*

"Centroid-based document classification: Analysis and experimental results." European conference on principles of data mining and knowledge discovery. Berlin, Heidelberg: Springer Berlin Heidelberg, 2000, (Han et al.) (Year: 2000).*

Velden, et al., "Comparison of Topic Extraction Approaches and Their Results," https://pure.knaw.nl/ws/portalfiles/portal/4247535/preprint_Velden_comparison.pdf, Feb. 2017, 66 pages.

Dong, et al., "Topic Extraction from Online Reviews for Classification and Recommendation," Proceedings of the Twenty-Third International Joint Conference on Artificial Intelligence (IJCAI 13), https://researchrepository.ucd.ie/bitstream/10197/8457/4/Topic%20Extraction%20from%20Online%20Reviews%20for%20Classification%20and%20Recommendation.pdf, Aug. 2013, 8 pages.

Mihalcea, et al., "TextRank: Bringing Order into Texts," Proceedings of the 2004 Conference on Empirical Methods In Natural Language Processing, https://aclanthology.org/W04-3252.pdf, Jul. 2004, 8 pages.

Bougouin, et al., "TopicRank: Graph-Based Topic Ranking for Keyphrase Extraction," International Joint Conference on Natural Language Processing (IJCNLP), https://hal.archives-ouvertes.fr/hal-00917969/document, Oct. 2013, 10 pages.

Slido, "Teacher Convention," https://app.sli.do/event/9EiTA1Nqz1h3sSU4PetrvT/live/questions, Jun. 2022, 2 pages.

Suppa, et al., "Cost-effective Deployment of BERT Models in Serverless Environment," Proceedings of the 2021 Conference of the North American Chapter of the Association for Computational Linguistics: Human Language Technologies: Industry Papers, https://aclanthology.org/2021.naacl-industry.24/, Jun. 2021, 9 pages.

Meng, et al., "Detecting topics and overlapping communities in Question and Answer sites," Social Network Analysis and Mining, vol. 5, Dec. 2015, 27 pages.

Post Image, "Question-topics-bid," retrieved from https://postimg.cc/NyNPCK6R on Jul. 17, 2025, 1 page.

* cited by examiner

AUTOMATIC EXTRACTION OF SEMANTICALLY SIMILAR QUESTION TOPICS

TECHNICAL FIELD

The present disclosure relates to automatic extraction of semantically similar question topics.

BACKGROUND

In the field of natural language processing, there have been many technological advances that enable computer systems to summarize articles, identify common topics or tones in text samples, and the like. Automatic topic extraction enables different text samples that are semantically similar to be grouped together, which can be useful when categorizing text samples or addressing issues common to those text samples. However, automatic topic extraction models may often fail to identify common text samples, or may incorrectly group unrelated text samples together.

DETAILED DESCRIPTION

Overview

Figure 1:
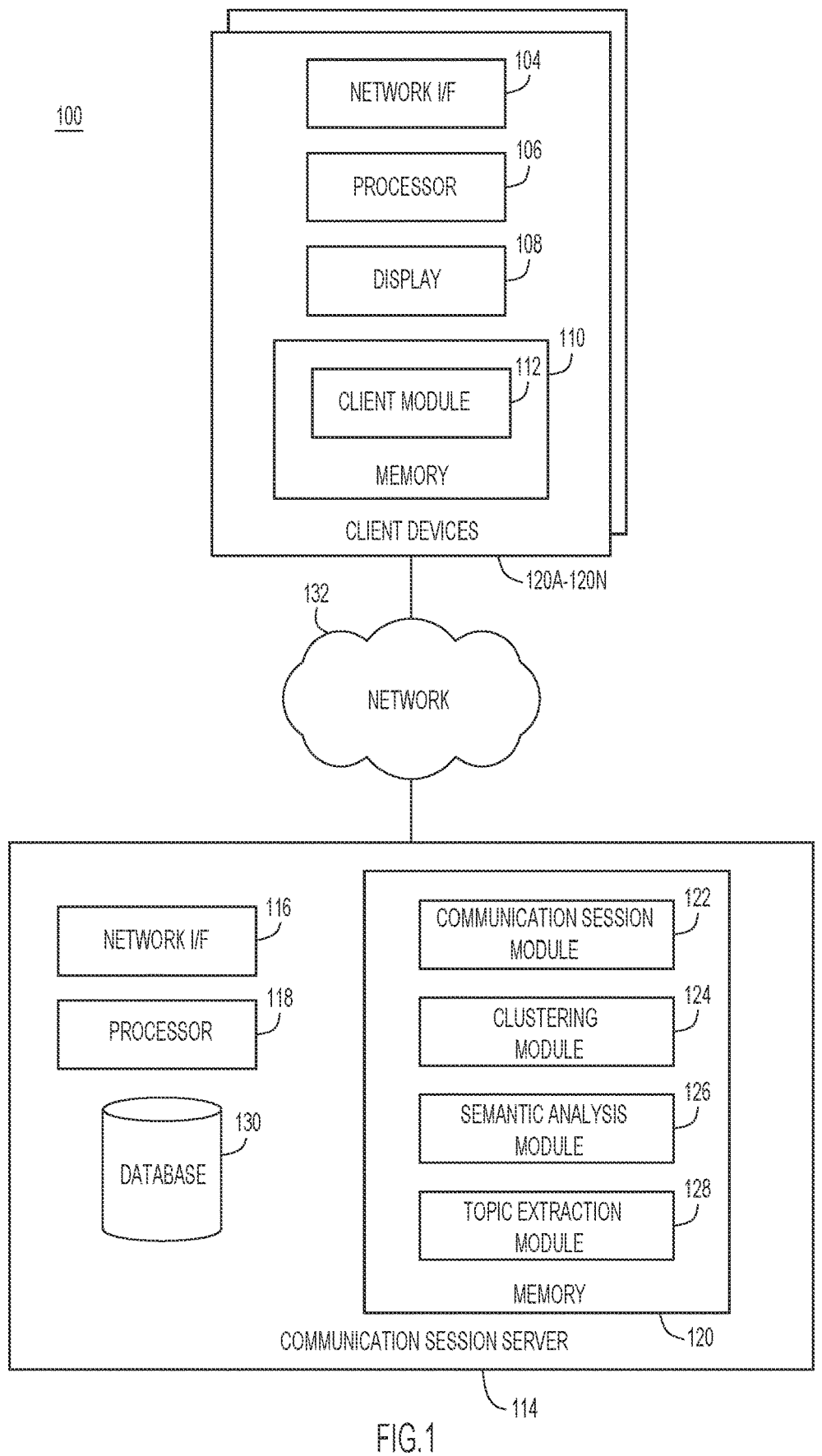
FIG. 1 is a block diagram of a computing environment for topic extraction, according to an example embodiment.

According to one embodiment, techniques are provided for automatically extracting semantically-similar question topics. A set of documents, wherein each document includes a plurality of words. One or more clusters of documents are identified in the set of documents based on a presence of common words in the documents of the one or more clusters. The one or more clusters are adjusted based on semantic similarity by adding or removing one or more documents from the one or more clusters. A topic is extracted from each adjusted cluster of documents.

Example Embodiments

A question-and-answer session may refer to a collaborative effort among a group of individuals who are looking to address questions submitted by the participants. Typically, but not always, there are two groups of participants: a first group who may submit questions, and a second, smaller group to whom those questions are posed. For example, a business group may conduct a question-and-answer session in which employees present questions to managers officiating the meeting, and the managers can then answer those questions.

In the field of natural language processing, vector space models are typically used to represent text samples as vectors in a manner that enables the text samples to be compared to each other (e.g., to measure similarity). However, this approach may not provide a desired level of accuracy in terms of identifying similar text samples. Accordingly, presented herein are techniques that combine textual overlap analysis with the merging mechanism of semantic similarity in order to yield a novel method of topic extraction. In particular, text samples can be grouped on the basis of textual overlap (e.g., the number of words in common), and then, a semantic similarity-based approach can be conducted in order to add or remove text samples from each identified group. Thus, present embodiments combine the offerings of textual overlap and semantic similarity in order to benefit from both techniques, thereby improving the accuracy of the topic extraction model.

Thus, present embodiments improve the field of natural language processing by improving the accuracy of topic extraction. The techniques described herein have the practical application of improving topic extraction with regard to questions posed during a question-and-answer session, enabling same or similar questions to be addressed as a group rather than individually. Thus, present embodiments can improve the efficiency of a question-and-answer session by reducing the amount of time required to address the participants' questions. Moreover, feedback can be collected in order to improve the accuracy of a topic extraction model over time, thereby enabling present embodiments to continuously improve in accuracy.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments will now be described in detail with reference to the Figures. FIG. 1 is a block diagram of a computing environment 100 for topic extraction, according to an example embodiment. As depicted, computing environment 100 includes client devices 102A-102N, a communication session server 114, and a network 132. It is to be understood that the functional division among components of computing environment 100 have been chosen for purposes of explaining various embodiments and is not to be construed as a limiting example.

Client device 102A-120N each include a network interface (I/F) 104, at least one processor 106, a display 108, and memory 110, which stores instructions for a client module 112. In various embodiments, each client device 102A-120N may include a rack-mounted server, laptop, desktop, smartphone, tablet, or any other programmable electronic device capable of executing computer readable program instructions. Network interface 104 enables components of each client device 102A-102N to send and receive data over a network, such as network 132. Display 108 may include any electronic device capable of presenting information in a visual form. For example, display 108 may be a liquid crystal display (LCD), a cathode ray tube (CRT) display, a light-emitting diode (LED) display, an electronic ink display, a virtual reality or augmented reality display, and the like. In general, client devices 102A-102N may be used by participants in a question-and-answer session to pose questions, view questions, provide answers, and/or view answers.

Client module 112 may include one or more modules or units to perform various functions of the embodiments described below. Client module 112 may be implemented by any combination of any quantity of software and/or hardware modules or units, and may reside within memory 110 of any of client devices 102A-102N for execution by a processor, such as processor 106.

Client module 112 enables a user of each client device 102A-102N to participate in a communication session, such as a question-and-answer session. Client module 112 may enable different client devices 102A-102N to exchange data with each other via a network (e.g., network 132). In various embodiments, client module 112 may exchange data comprising text, video, audio, images, or any combinations thereof. In one embodiment, client module 112 interacts with communication session module 122 of communication session server 114 in order to facilitate the transfer of data between different client devices 102A-102N. Thus, client module 112 may act as a client for a communication session, with communication session module 122 functioning as a host or server.

Communication session server 114 includes a network interface (I/F) 116, at least one processor 118, memory 120, and a database 130. Memory 120 may store instructions for a communication session module 122, a clustering module 124, a semantic analysis module 126, and a topic extraction module 128. In various embodiments, client devices 102A-102N may include a rack-mounted server, laptop, desktop, smartphone, tablet, or any other programmable electronic device capable of executing computer readable program instructions. Network interface 116 enables components of communication session server 114 to send and receive data over a network, such as network 132. In general, communication session server 114 hosts communication sessions (e.g., question-and-answer sessions), and analyzes submitted questions to group similar questions and extract topics accordingly.

Communication session module 122, clustering module 124, semantic analysis module 126, and topic extraction module 128 may include one or more modules or units to perform various functions of the embodiments described below. Communication session module 122, clustering module 124, semantic analysis module 126, and topic extraction module 128 may be implemented by any combination of any quantity of software and/or hardware modules or units, and may reside within memory 120 of communication session server 114 for execution by a processor, such as processor 118.

Communication session module 122 may host communication sessions by facilitating the exchange of data between client devices 102A-102N via client module 112. The communication sessions may be text-based, or may include video and/or audio data. In some embodiments, communication session module 122 may execute instructions received by a meeting host or an administrator (e.g., a user of a particular client device) to cause client devices 102A-102N of other participants to display particular data, such as a specific view (e.g., a shared view of a particular device's user interface), a document, or a portion of text (e.g., a particular question and/or answer). Communication session module 122 may receive data that is indicated as including a question or an answer; for example, text data may include metadata or another indicator to specify that the text data comprises a question and/or an answer. Communication session module 122 may provide data to the other modules of communication session server 114 (e.g., clustering module 124, semantic analysis module 126, and/or topic extraction module 128) so that the data can be processed in accordance with present embodiments.

Clustering module 124 may analyze a set of received text samples (e.g., questions submitted by participants) in order to identify clusters of documents based on the presence of common words in those documents. Each document may include a text sample and may correspond to a question that is posed by a participant in a question-and-answer session. Initially, clustering module 124 may perform various preprocessing tasks, such as tokenization of text, stemming, lemmatization, and the like. In some embodiments, tokenization is performed by identifying smaller sequences of words in each document. A set of potential key phrases, referred to as candidates, can be extracted from each document by identifying a list of noun phrases, optionally including one or more adjectives or adverbs. In various embodiments, adjectives and/or adverbs may precede the nouns or may be present in other orders of a noun sequence (e.g., in between or after nouns).

Once the candidates are extracted, clustering module 124 may compare candidates to each other in order to group candidates into clusters. Candidates can be assigned to a same cluster based on an overlap of words (e.g., a presence of a threshold number of same words, subwords or other word properties). The threshold can be determined by a user and/or can be determined manually or using machine learning by analyzing a test set of documents (e.g., questions). For example, candidates that have at least 50% of words in common may be assigned to a same cluster.

Once clustering is completed, clustering module 124 may provide the clusters to semantic analysis module 126. Semantic analysis module can convert each candidate into a vector representation using any vector space modeling technique, such as sent2vec or a bidirectional encoder representations from transformers (BERT) language model. Next, the clusters are identified in the vector space model, and can be adjusted using semantic similarity analysis to add or remove individual candidates from each cluster.

In particular, a candidate that is not assigned to a cluster can be added to a cluster, or a candidate that is already assigned to a cluster may be removed from the cluster, based on the distance of the candidate to the centroid of the cluster. It should also be appreciated that in some embodiments, a candidate may be assigned to multiple clusters, and/or some candidates may not be assigned to any cluster. In one embodiment, a candidate is assigned to a cluster when the candidate is within a threshold distance of the centroid of the cluster; similarly, if a candidate does not satisfy the threshold distance criterion, the candidate may be unassigned from that cluster. The threshold distance t can be determined according to equation (1):

$$t = W \cdot C + (1 - W) \cdot \log_2(1 + Coh_c) \quad (1)$$

where W is a scaling constant, C is a similarity constant, and $Coh_c$ represents a cohesion of the receiving cluster (i.e., the mean distance of its component candidates to the centroid). W and C may be constants that are predetermined or adjusted based on user feedback; in one embodiment, W may be approximately or equal to 0.8 and C may be approximately or equal to 0.3. Accordingly, Semantic analysis module 126 may identify clusters in an iterative process, as the cohesion of clusters changes whenever a candidate is added or removed from a cluster. Semantic analysis module 126 may adjust clusters for a preset number of iterations, or semantic analysis module 126 may adjust clusters until a number of changes in an iteration (e.g., a number of additions or removals of candidates to/from clusters) falls to below a threshold value. In other embodiments, only one iteration may be performed.

Topic extraction module 128 may extract a topic from each cluster that is established after processing by semantic analysis module 126 is completed. A topic can be selected by identifying a specific representative candidate in each cluster. In some embodiments, the representative candidate may correspond to whichever candidate is nearest to the centroid of the cluster. In some embodiments, the representative candidate may be determined by identifying the candidate that includes the longest possible sequence of stems that is found in the majority of candidates. In the case that a stem is present that has multiple lexical forms, the shortest lexical form is preferred in order to decrease processing requirements.

Once the representative candidate is identified, topic extraction module 128 may determine the document (e.g., question) from which that representative candidate was extracted. The representative candidate from the identified document may then be submitted as the topic of that cluster. Thus, topic extraction module 128 can provide a topic in the form of a particular document, which can then be presented to one or more users. In one embodiment, the topic is a question that can be submitted to a user during a question-and-answer session, who then may provide an answer to the question to other participants.

Database 130 may include any non-volatile storage media known in the art. For example, database 130 can be implemented with a tape library, optical library, one or more independent hard disk drives, or multiple hard disk drives in a redundant array of independent disks (RAID). Similarly, data in database 130 may conform to any suitable storage architecture known in the art, such as a file, a relational database, an object-oriented database, and/or one or more tables. Database 130 may store data including one or more sets of documents (e.g., submitted questions), metadata for those documents (e.g., metadata indicating relationships between documents, such as cluster assignment), vector space model data, and the like.

Network 132 may include a local area network (LAN), a wide area network (WAN) such as the Internet, or a combination of the two, and includes wired, wireless, or fiber optic connections. In general, network 132 can be any combination of connections and protocols known in the art that will support communications between client devices 102A-102N and communication session server 114 via their respective network interfaces in accordance with the described embodiments.

Figure 2:
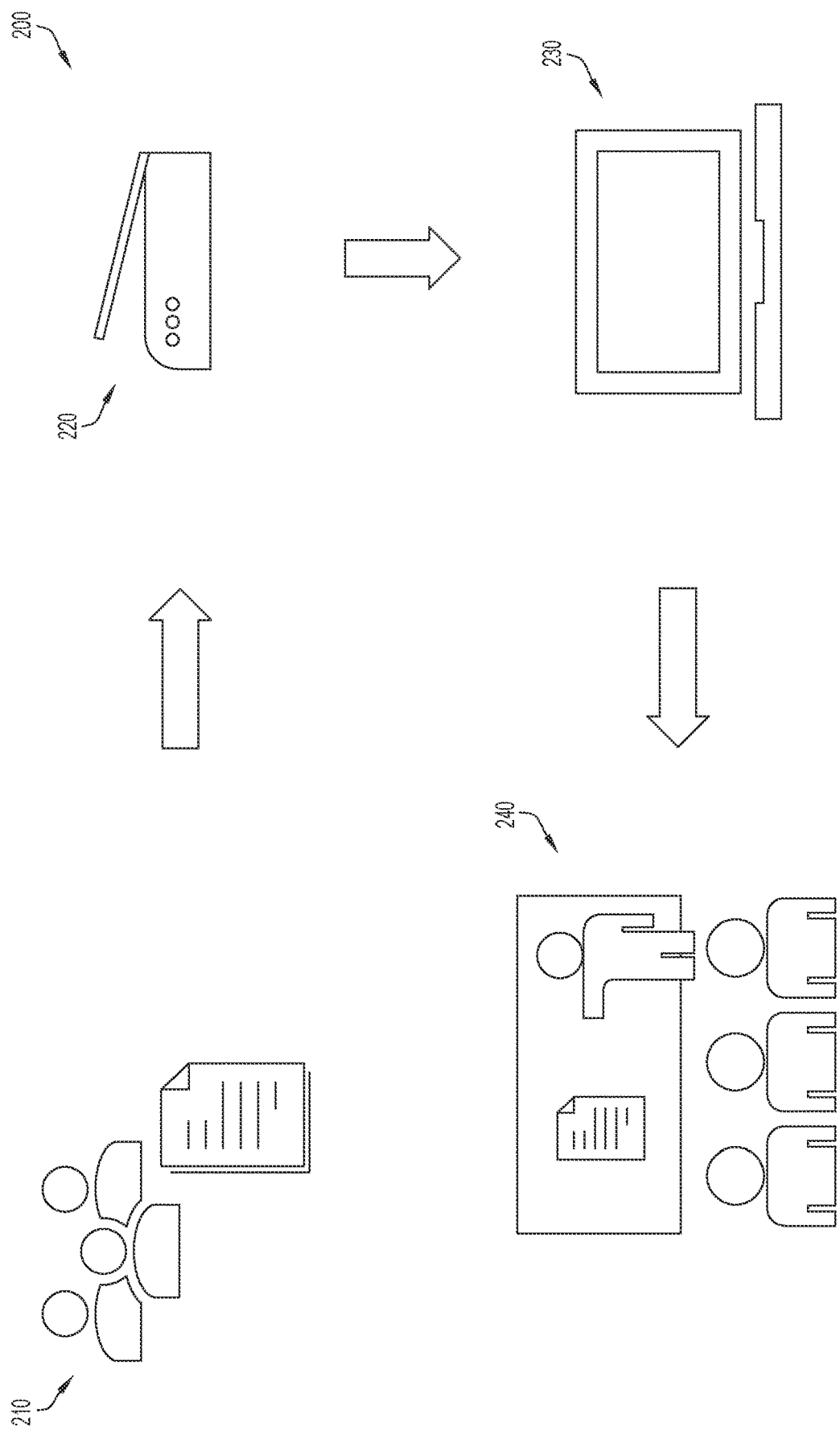
FIG. 2 is a block diagram depicting a workflow for conducting a question-and-answer session using automatic topic extraction, according to an example embodiment.

Reference is now made to FIG. 2. FIG. 2 is a block diagram depicting a workflow 200 for conducting a question-and-answer session using automatic topic extraction, according to an example embodiment. As depicted, a group of participants may submit question at operation 210. Each participant may submit one or more questions by either printing out or handwriting the questions to paper. These papers may be collected individually as each user completes their questions or collectively at a same time during a question-and-answer session.

At operation 220, the papers may be scanned using a scanner or camera. Once digitalized, the data corresponding to the papers can be submitted to a computing device (e.g., communication session server 114). At operation 230, the computing device may perform optical character recognition or handwriting-to-text conversion in order to convert the submitted questions into text (e.g., a character encoding standard such as the American Standard Code for Information Interchange (ASCII)).

The text of each document may then be processed by the computing device (e.g., communication session server 114) according to present embodiments in order to extract one or more topics from the group of documents. These topics can be presented to the participants at operation 240. In some embodiments, each topic is presented at a particular display, such as a television, computer monitor, or projected display, so that the participants may view the topic. Thus, a question can be submitted so that participants may collaboratively review each question and be instructed as to the answer for each question.

Figure 3:
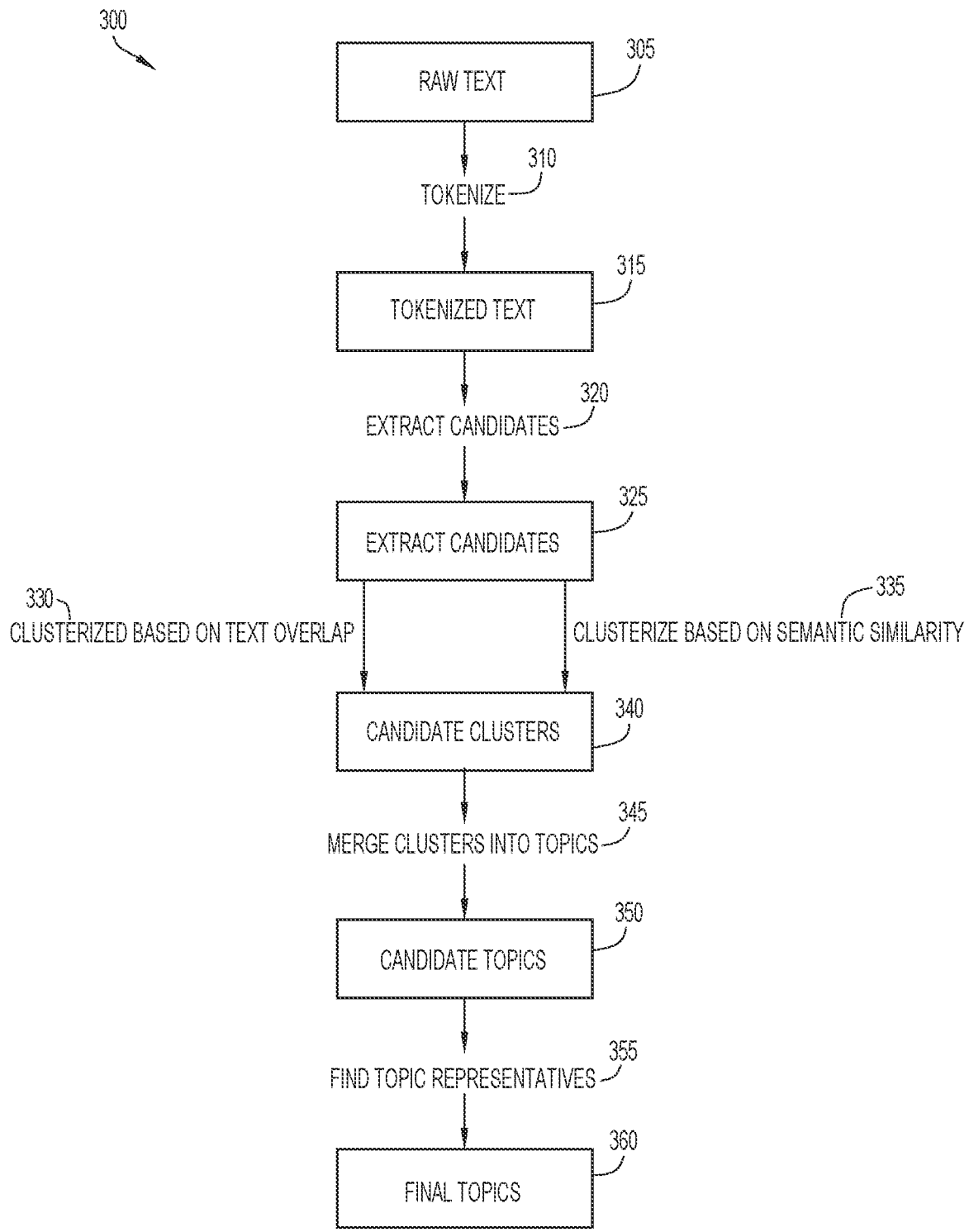
FIG. 3 is a flow chart of a method of automatic topic extraction, according to an example embodiment.

Turning now to FIG. 3, a flow chart is provided of a method 300 of automatic topic extraction, according to an example embodiment. initially, raw text 305 is received in the form of a set of documents. Each document may be a question that is submitted by a participant in a question-and-answer session. At operation 310, the text is tokenized by extracting shorter noun sequences from each document. Each sequence may include one or more nouns, and can optionally include adjectives and/or adverbs that are preceding, intervening, or coming after the noun or nouns. In some embodiments, stemming or lemmatization may be performed on the raw text 305 prior to tokenization.

Tokenized text 315 is then processed at operation 320 in order to extract candidates from the tokenized text. Each candidate may include a particular noun sequence that is extracted at operation 310. These extracted candidates 325 are then processed at operations 330 and 335 in order to group candidates into clusters based on text overlap (operation 330) and semantic similarity (operation 335). The text overlap operation 330 identifies clusters based on the presence of common words in compared candidates. For example, if 50% (or some other desired threshold value) of the words in a candidate match another candidate, those candidates will be assigned to the same cluster. Clusters are then adjusted at operation 335 using a semantic similarity approach in which candidates are added to, or removed from, a cluster on the basis of that candidate's nearness to the centroid of the cluster. Thus, operation 335 may utilize a vector space model in which the candidates are converted to vectors prior to the semantic similarity analysis. The nearness to a centroid can be a threshold value that is predefined or determined using other techniques, and can be adjusted based on user feedback.

Candidate clusters 340 are output and merged into topics at operation 345. Each candidate cluster includes two or more candidates that were assigned to the cluster via operations 330 and 335. These candidate clusters are merged into groups at operation 345, resulting in candidate topics at 350. At operation 355, the representative candidate is identified for each cluster by selecting a particular candidate in the cluster. The representative candidate can be a candidate that is closest to a centroid of the cluster, or a candidate that has a longest sequence of stemmed words in common with a majority of the other candidates in that cluster. Next, the document corresponding to each representative candidate (e.g., the document from which that candidate was initially extracted) can be selected as a final topic 360 that is output by the system.

Figure 4:
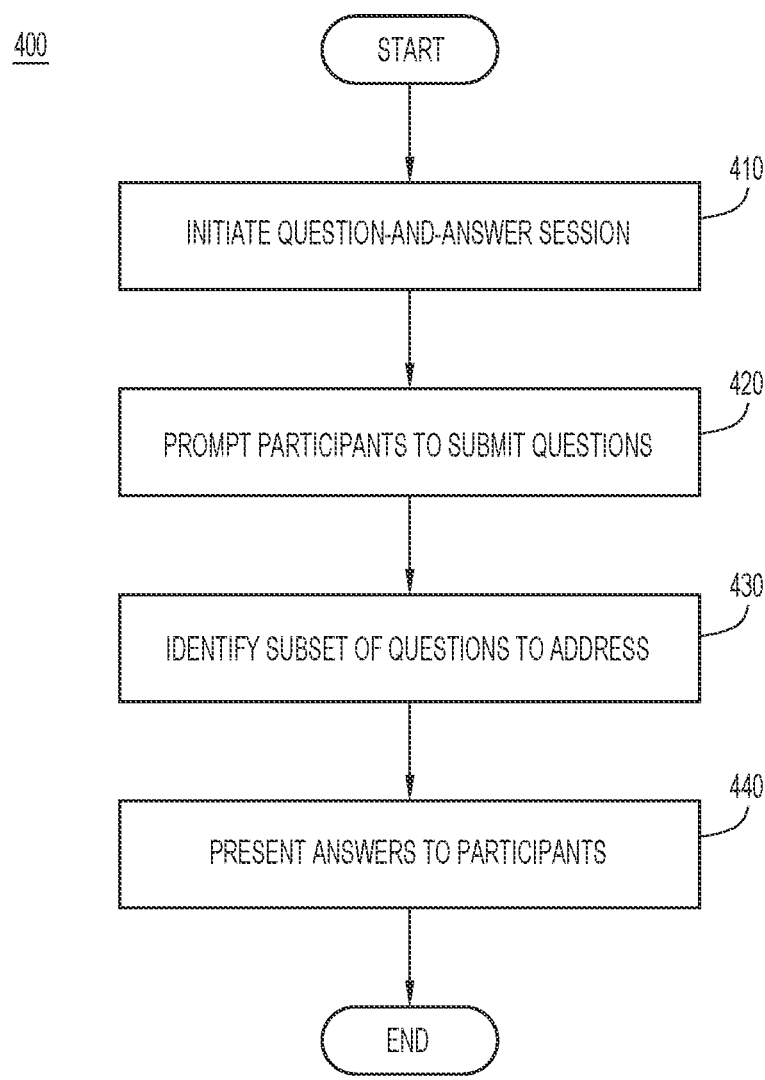
FIG. 4 is a flow chart of a method of conducting a question-and-answer session, according to an example embodiment.

FIG. 4 is a flow chart of a method 400 of conducting a question-and-answer session, according to an example embodiment.

The question-and-answer session is initiated at operation 410. The session may be a communication session, such as a teleconference, in which users can communicate via networked computing devices. Thus, the participants may be physically remote from each other, or some or all of the participants may be present in a same physical space.

Participants are prompted to submit questions at operation 420. Each participant may submit a question electronically via a computing device, such as a computer, smartphone, tablet, and the like. Additionally or alternatively, questions may be submitted on paper, which can be digitalized to extract computer-readable text from each paper.

A subset of questions to address is identified at operation 430. The submitted questions are analyzed using word overlap and semantic similarity techniques in accordance with the embodiments presented herein, and clustered into groups that each represent a same or similar set of questions. A representative question can be selected from each group and presented to an official who is responsible for answering the questions; the questions can be presented one at a time to the official or individually, and can be presented via a computing device of that official.

Answers are presented to the participants at operation 440. The official may provide answers to the question in the communication session. The answers can be spoken and thus provided via audio, or can be typed and presented at the displays of the participants' computing devices. In some embodiments, questions and corresponding answers are automatically converted into a slide show document that is presented to the users. For example, each slide may include a particular question and its corresponding answer.

Figure 5:
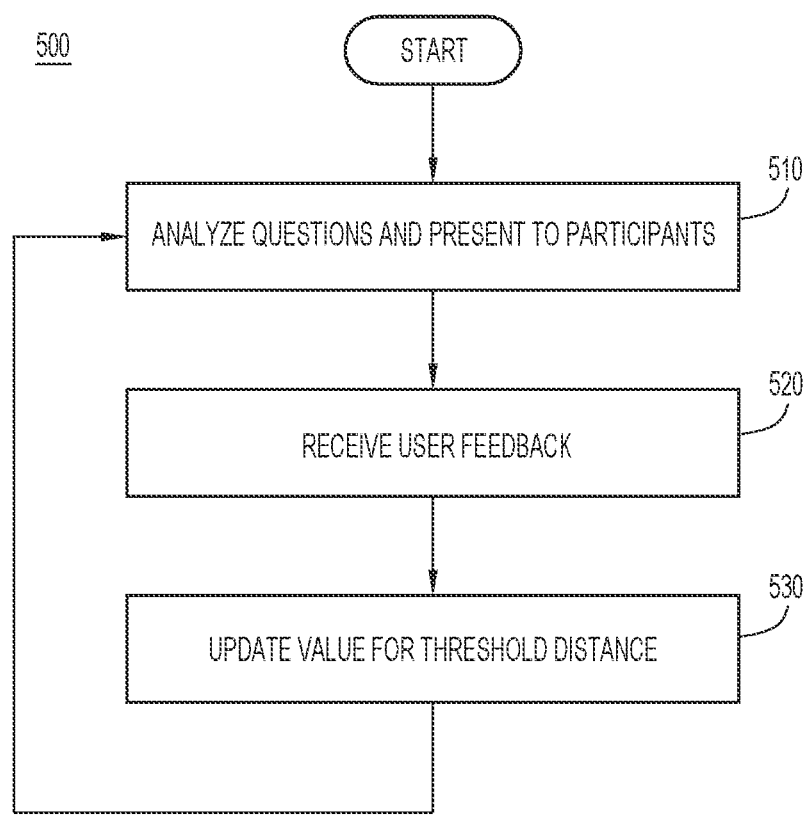
FIG. 5 is a flow chart of a method of updating a topic extraction model, according to an example embodiment.

FIG. 5 is a flow chart of a method 500 of updating a topic extraction model, according to an example embodiment.

The questions that have been selected in accordance with present embodiments are analyzed by an official and presented to participants of a question-and-answer session at operation 510. Each question may be representative of a number of questions submitted by various participants.

At operation 520, user feedback is received. The user feedback may be collected from an official who is charged with answering the selected questions and/or by the participants who submitted the question. The user feedback for each question may indicate whether that question is actually representative of submitted questions. Thus, user feedback may include a binary yes/no submission indicating whether the question is relevant, or the user feedback may include a particular number of a scale (e.g., 1 through 10) that ranks the relevance of a question.

The values used to select the threshold distance for adding or removing questions from a cluster are updated based on the user feedback at operation 530. According to equation (1), described with reference to FIG. 1, the W and/or C values may be adjusted in order to improve the accuracy of the topic extraction model. In some embodiments, the adjustments are performed by a neural network that is trained using training data that includes example values for W and C and corresponding example user feedback. Then, the trained machine learning model can be applied by inputting actual user feedback in order to adjust the W and C values, and accordingly, the threshold t value, for the topic extraction model.

Figure 6:
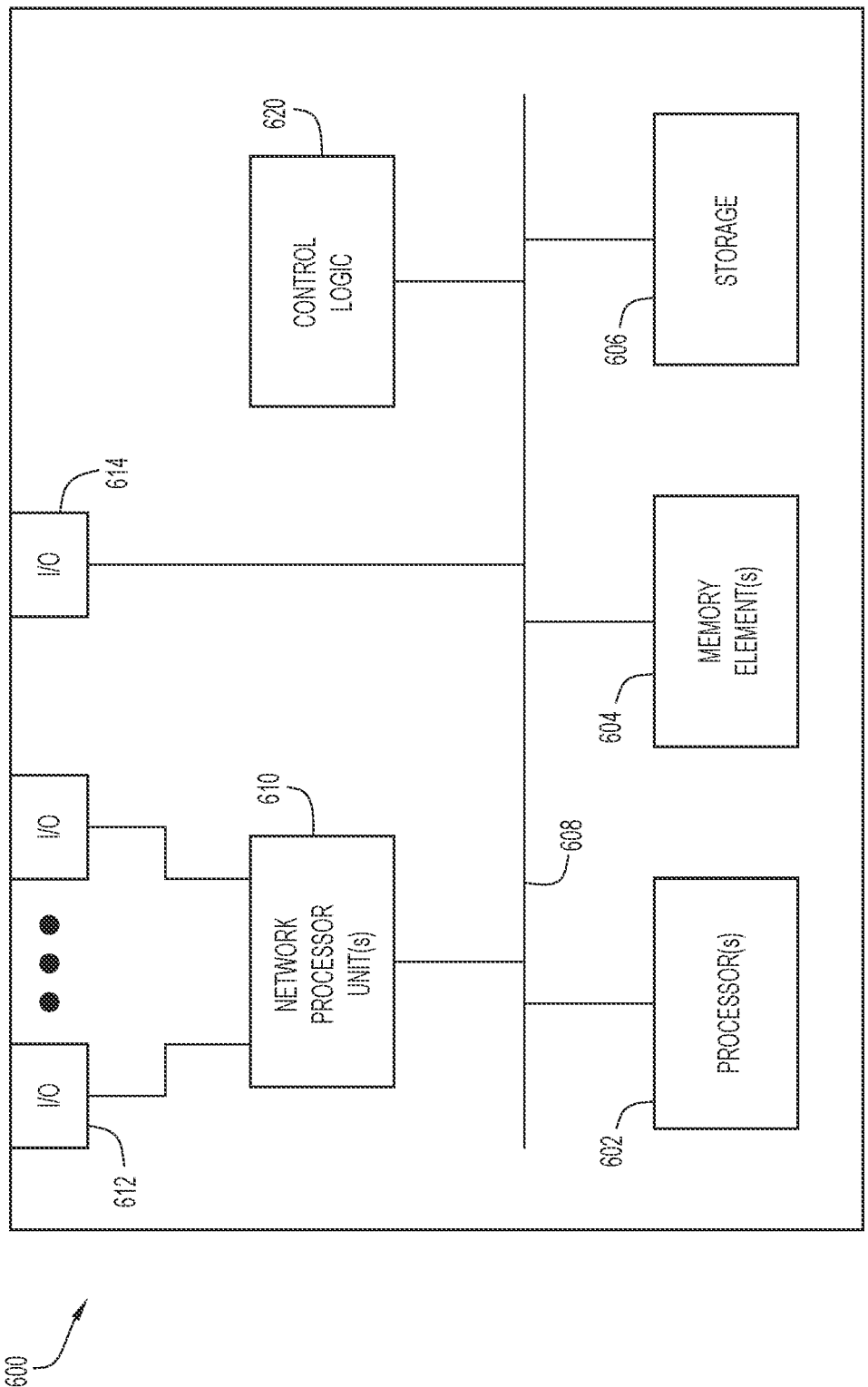
FIG. 6 is a block diagram of a device that may be configured to extract semantically-similar question topics, as presented herein.

Referring now to FIG. 6, a block diagram is shown of a computing device 600 that may perform functions associated with the techniques discussed herein in connection with FIGS. 1-4.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O 614, and 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O 614 allow for input and output of data and/or information with other entities that may be connected to computing device 600. For example, I/O 614 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm·wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a computer-implemented method including: obtaining a set of documents, wherein each document includes a plurality of words; identifying one or more clusters of documents in the set of documents based on a presence of common words in the documents of the one or more clusters; adjusting the one or more clusters based on semantic similarity by adding or removing one or more documents from the one or more clusters; and extracting a topic from each adjusted cluster of documents.

In some aspects, the techniques described herein relate to a computer-implemented method, wherein each document is a question submitted by a participant of a question-and-answer session.

In some aspects, the techniques described herein relate to a computer-implemented method, wherein extracting the topic from a particular cluster includes identifying a particular document having a longest sequence of stemmed words in common with a majority of other documents of the particular cluster.

In some aspects, the techniques described herein relate to a computer-implemented method, wherein adding or removing the one or more documents from the one or more clusters includes generating a representation of the set of documents in a vector space, identifying a centroid for each cluster in the vector space, and adding or removing the one or more documents based on the one or more documents being within a threshold distance from the centroid.

In some aspects, the techniques described herein relate to a computer-implemented method, further including: obtaining user feedback in response to presenting the extracted topic to one or more users; and adjusting a value for the threshold distance based on the user feedback.

In some aspects, the techniques described herein relate to a computer-implemented method, further including presenting the extracted topic to one or more users via a display.

In some aspects, the techniques described herein relate to a computer-implemented method, wherein the plurality of words in each document are tokenized prior to identifying the one or more clusters of documents.

In some aspects, the techniques described herein relate to a computer system including: one or more computer processors; one or more computer readable storage media; and program instructions stored on the one or more computer readable storage media for execution by at least one of the one or more computer processors, the program instructions including instructions to: obtain a set of documents, wherein each document includes a plurality of words; identify one or more clusters of documents in the set of documents based on a presence of common words in the documents of the one or more clusters; adjust the one or more clusters based on semantic similarity by adding or removing one or more documents from the one or more clusters; and extract a topic from each adjusted cluster of documents.

In some aspects, the techniques described herein relate to a computer system, wherein each document is a question submitted by a participant of a question-and-answer session.

In some aspects, the techniques described herein relate to a computer system, wherein the instructions to extract the topic from a particular cluster include instructions to identify a particular document having a longest sequence of stemmed words in common with a majority of other documents of the particular cluster.

In some aspects, the techniques described herein relate to a computer system, wherein adding or removing the one or more documents from the one or more clusters includes generating a representation of the set of documents in a vector space, identifying a centroid for each cluster, and adding or removing the one or more documents based on the one or more documents being within a threshold distance from the centroid.

In some aspects, the techniques described herein relate to a computer system, wherein the instructions further include instructions to: obtain user feedback in response to presenting the extracted topic to one or more users; and adjust a value for the threshold distance based on the user feedback.

In some aspects, the techniques described herein relate to a computer system, further including instructions to present the extracted topic to one or more users via a display.

In some aspects, the techniques described herein relate to a computer system, wherein the plurality of words in each document are tokenized prior to identifying the one or more clusters of documents.

In some aspects, the techniques described herein relate to a computer program product including one or more computer readable storage media collectively having program instructions embodied therewith, the program instructions executable by a computer to cause the computer to perform operations including: obtain a set of documents, wherein each document includes a plurality of words; identify one or more clusters of documents in the set of documents based on a presence of common words in the documents of the one or more clusters; adjust the one or more clusters based on semantic similarity by adding or removing one or more documents from the one or more clusters; and extract a topic from each adjusted cluster of documents.

In some aspects, the techniques described herein relate to a computer program product, wherein each document is a question submitted by a participant of a question-and-answer session.

In some aspects, the techniques described herein relate to a computer program product, wherein the program instructions to extract the topic from a particular cluster further cause the computer to identify a particular document having a longest sequence of stemmed words in common with a majority of other documents of the particular cluster.

In some aspects, the techniques described herein relate to a computer program product, wherein adding or removing the one or more documents from the one or more clusters includes generating a representation of the set of documents in a vector space, identifying a centroid for each cluster, and adding or removing the one or more documents based on the one or more documents being within a threshold distance from the centroid.

In some aspects, the techniques described herein relate to a computer program product, wherein the program instructions further cause the computer to: obtain user feedback in response to presenting the extracted topic to one or more users; and adjust a value for the threshold distance based on the user feedback.

In some aspects, the techniques described herein relate to a computer program product, wherein the program instructions further cause the computer to present the extracted topic to one or more users via a display.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
obtaining, via at least one processor, a set of documents submitted by participants from a communication session conducted over a network, wherein each document is in electronic form and includes a plurality of words;
identifying, via the at least one processor, one or more clusters of documents in the set of documents based on a presence of a threshold number of common words in documents of the one or more clusters of documents;
adjusting the one or more clusters of documents, via the at least one processor, based on semantic similarity by adding or removing one or more documents from a cluster based on the one or more documents being within a threshold distance from the cluster, wherein the threshold distance is based on a plurality of adjustable values;
extracting, via the at least one processor, a topic from each adjusted cluster of documents;
determining, via the at least one processor, a document from each adjusted cluster of documents containing the topic;
sending, via the at least one processor, the document from each adjusted cluster of documents to a participant of the communication session to produce a response pertaining to the topic from each adjusted cluster of documents, wherein sending the document from each adjusted cluster enables the response to be produced for remaining documents in each adjusted cluster rather than sending individual documents of each adjusted cluster;
presenting, via the at least one processor, the response to the participants in the communication session, and adjusting, via the at least one processor, the threshold distance for adjustment of document clusters by modifying the plurality of adjustable values based on user feedback for the topic from each adjusted cluster of documents.

2. The computer-implemented method of claim 1, wherein each document is a question submitted by a participant of a question-and-answer session.

3. The computer-implemented method of claim 1, wherein extracting the topic from a particular cluster includes identifying a particular document having a longest sequence of stemmed words in common with a majority of other documents of the particular cluster.

4. The computer-implemented method of claim 1, wherein adding or removing the one or more documents from a cluster comprises generating a representation of the set of documents in a vector space, identifying a centroid for the cluster in the vector space, and adding or removing the one or more documents based on the one or more documents being within the threshold distance from the centroid.

5. The computer-implemented method of claim 1, further comprising:
obtaining the user feedback in response to presenting the topic to one or more users.

6. The computer-implemented method of claim 1, further comprising presenting the topic to one or more users via a display.

7. The computer-implemented method of claim 1, wherein the plurality of words in each document are tokenized prior to identifying the one or more clusters of documents.

8. A computer system comprising:
one or more computer processors;
one or more computer readable storage media; and
program instructions stored on the one or more computer readable storage media for execution by at least one of the one or more computer processors, the program instructions comprising instructions to perform operations including:
obtaining a set of documents submitted by participants from communication session conducted over a network, wherein each document is in electronic form and includes a plurality of words;
identifying one or more clusters of documents in the set of documents based on a presence of a threshold number of common words in documents of the one or more clusters of documents;
adjusting the one or more clusters of documents based on semantic similarity by adding or removing one or more documents from a cluster based on the one or more documents being within a threshold distance from the cluster, wherein the threshold distance is based on a plurality of adjustable values;
extracting a topic from each adjusted cluster of documents;
determining a document from each adjusted cluster of documents containing the topic:
sending the document from each adjusted cluster of documents to a participant of the communication session to produce a response pertaining to the topic from each adjusted cluster of documents, wherein sending the document from each adjusted cluster enables the response to be produced for remaining documents in each adjusted cluster rather than sending individual documents of each adjusted cluster:
presenting the response to the participants in the communication session, and adjusting the threshold distance for adjustment of document clusters by modifying the plurality of adjustable values based on user feedback for the topic from each adjusted cluster of documents.

9. The computer system of claim 8, wherein each document is a question submitted by a participant of a question-and-answer session.

10. The computer system of claim 8, wherein the am instructions to extract the topic from a particular cluster include program instructions to perform further operations including a particular document having a longest sequence of stemmed words in common with a majority of other documents of the particular cluster.

11. The computer system of claim 8, wherein adding or removing the one or more documents from a cluster comprises generating a representation of the set of documents in a vector space, identifying a centroid for the cluster, and adding or removing the one or more documents based on the one or more documents being within the threshold distance from the centroid.

12. The computer system of claim 8, wherein the program instructions further comprise program instructions to perform further operations including:
obtaining the user feedback in response to presenting the topic to one or more users.

13. The computer system of claim 8, further comprising program instructions to perform further operations including presenting the topic to one or more users via a display.

14. The computer system of claim 8, wherein the plurality of words in each document are tokenized prior to identifying the one or more clusters of documents.

15. One or more non-transitory computer readable storage media encoded with program instructions that when executed by a computer, cause the computer to perform operations including:
obtaining a set of documents submitted by participants from a communication session conducted over a network, wherein each document is in electronic form and includes a plurality of words;
identifying one or more clusters of documents in the set of documents based on a presence of a threshold number of common words in documents of the one or more clusters of documents;
adjusting the one or more clusters of documents based on semantic similarity by adding or removing one or more documents from a cluster based on the one or more documents being within a threshold distance from the cluster, wherein the threshold distance is based on a plurality of adjustable values;
extracting a topic from each adjusted cluster of documents;
determining document from each adjusted cluster of documents containing the topic;
sending the document from each adjusted cluster of documents to a participant of the communication session to produce a response pertaining to the topic from each adjusted cluster of documents, wherein sending the document from each adjusted cluster enables the response to be produced for remaining documents in each adjusted cluster rather than sending individual documents of each adjusted cluster:
presenting the response to the participants in the communication session; and
adjusting the threshold distance for adjustment of document clusters by modifying the plurality of adjustable values based on user feedback for the topic from each adjusted cluster of documents.

16. The one or more non-transitory computer readable storage media of claim 15, wherein each document is a question submitted by a participant of a question-and-answer session.

17. The computer one or more non-transitory computer readable storage media of claim 15, wherein the program instructions to extract the topic from a particular cluster further cause the computer to perform further operations including identifying a particular document having a longest sequence of stemmed words in common with a majority of other documents of the particular cluster.

18. The one or more non-transitory computer readable storage media of claim 15, wherein adding or removing the one or more documents from a cluster comprises generating a representation of the set of documents in a vector space, identifying a centroid for the cluster, and adding or removing the one or more documents based on the one or more documents being within the threshold distance from the centroid.

19. The one or more non-transitory computer readable storage media of claim 5, wherein the program instructions further cause the computer to perform further operations including:
   obtaining the user feedback in response to presenting the topic to one or more users.

20. The one or more non-transitory computer readable storage media of claim 15, wherein the program instructions further cause the computer to perform further operations including presenting the topic to one or more users via a display.

* * * * *